May 8, 1951     C. N. ROSWELL     2,552,117
VALVE
Filed March 25, 1949
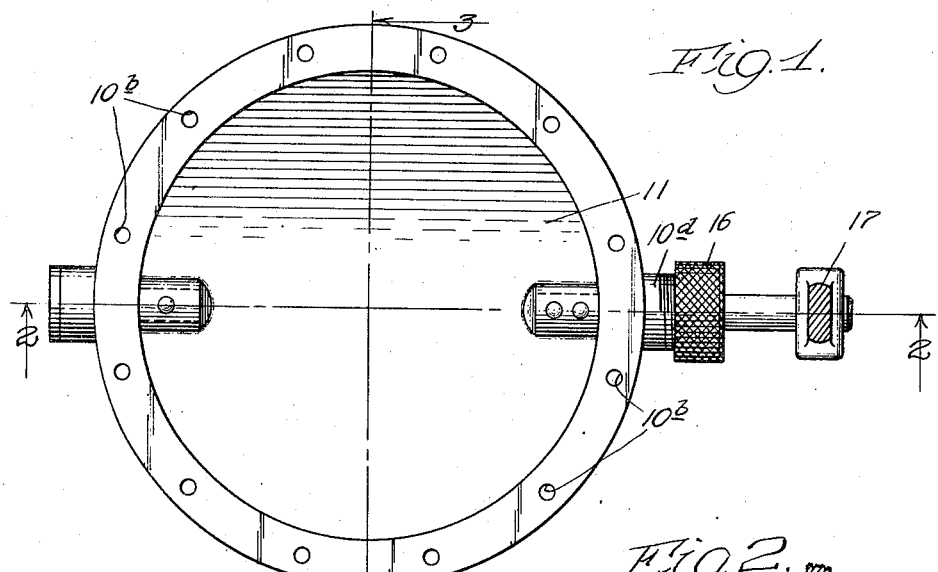
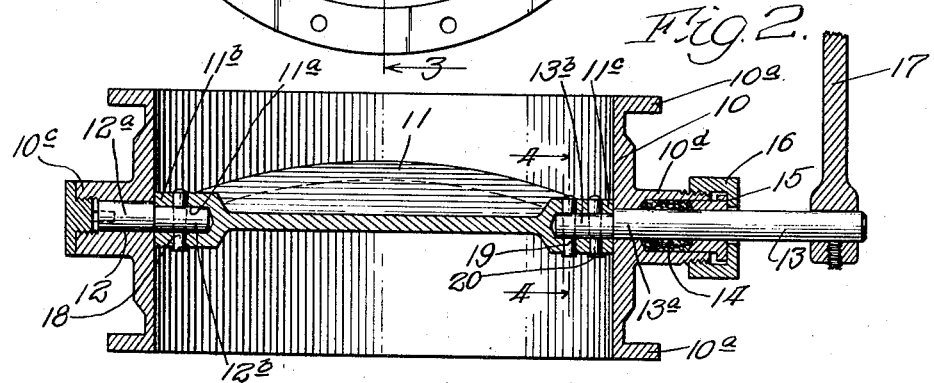
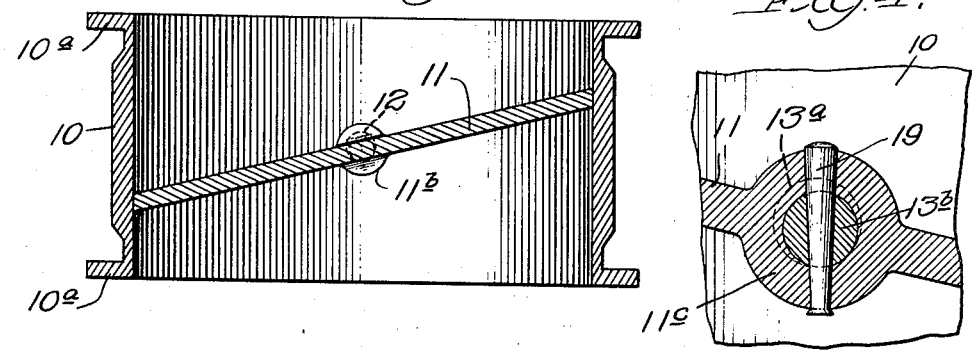
Inventor:
Charles N. Roswell,
By Schroeder, Merriam,
Hofgren, McBrady Attys.

Patented May 8, 1951

2,552,117

UNITED STATES PATENT OFFICE 2,552,117

VALVE

Charles Neil Roswell, Chicago, Ill.

Application March 25, 1949, Serial No. 83,464

3 Claims. (Cl. 251—11)

This invention relates to valves including a valve body and a valve disk therein oscillatable about an axis to open and closed positions.

The primary object of the invention is to provide an improved valve comprising a body and disk therein oscillatable to open and closed positions, together with a mounting structure for the disk that permits adusting the relative positions of the body and disk prior to a final assembling operation so as to obtain a closer fit between these elements around the entire periphery of the disk.

Another object of the invention is to provide such a valve including a pair of aligned shafts having their outer end portions journalled in the body with each shaft having an inner end portion engaging the disk and arranged eccentrically to said outer portion, said shafts having the axes of rotation of said outer portions substantially coinciding, and fastening members rigidly securing the inner end portions of the shafts to the disk.

A further object of the invention is to provide such a valve wherein, when the valve is closed, each end of the axis of the disk that is within the plane of the disk and at a right angle to the axis of oscillation is arranged at an acute angle to the adjacent portion of the valve body on one side of each end and at an obtuse angle thereto on the other side of each end.

Yet another object of the invention is the provision of such a valve wherein the inner end portion of each shaft is of substantially circular cross-section and has a diameter smaller than that of the outer end, and the surfaces of each inner and outer end are tangent to each other.

Another object of the invention is the provision of a method of assembling such a valve which comprises assembling the valve with the disk within the body and the shafts engaging the body and the valve disk and rotating the shafts with respect to the body and the disk to shift the disk to a position where the outer edge of the disk makes sealing contact with the inner surface of the body, and then rigidly securing the inner end portions of the shafts to the disk.

Other objects and advantages of the invention will become more apparent in the following description taken in conjunction with the accompanying drawings. Of the drawings:

Fig. 1 is a plan view of a valve embodying the invention.

Fig. 2 is a section taken substantially along line 2—2 of Fig. 1.

Fig. 3 is a section taken substantially along line 3—3 of Fig. 1.

Fig. 4 is a sectional view taken substantially along line 4—4 of Fig. 2.

In assembling valves, and particularly valves of the butterfly type having a disk located within the valve body and rotatable to open and closed positions, experience has proven that it is extremely difficult to obtain a perfect alignment of the disk with the valve body in order that sealing contact may be obtained between the disk and the body. This is particularly true where there is a metal-to-metal contact between the disk and the body. With present machinery it is relatively simple to machine accurately the valve body and the disk so that a perfect seal is obtained when the disk is located accurately within the valve body. The main difficulty heretofore has been in obtaining the proper location of the disk. In the present invention, the valve disk is rotatably supported on a pair of shafts engaging opposite sides of the valve disk and valve body. The end portions of the shafts that engage the body are rotatable about coinciding axes to rotate the disk. The inner end portions of the shafts also rotatably engage adjacent portions of the disk. These inner end portions are arranged eccentrically of the outer end portions so that when the valve is arranged in assembled relationship the shafts may be rotated either independently or together to shift the position of the disk and thus secure adequate sealing of the disk with the valve body when the disk is in closed position. Such an arrangement serves to simplify greatly the assembling of the valve and permits easy adjustment so that perfect sealing contact may be achieved.

In the embodiment illustrated in the drawings, the valve comprises a body 10 of generally cylindrical shape having end flanges 10a provided with spaced openings 10b for attaching the valve to adjacent pipe sections or the like. Located within the body 10 is a valve disk 11 that is rotatable to open and closed positions. In the drawings the valve disk is shown in closed position. The valve disk 11 is positioned so that one diameter thereof is at right angles to the inner surface of the valve body. This one diameter is the short axis of the disk. As is shown in Fig. 3, the axis of the closed disk that is within the plane of the disk and at a right angle to the axis of oscillation has each end arranged at an acute angle to the adjacent portion of the valve body on one side of this end and at an obtuse angle thereto on the other side of said end. This axis that is within the plane of the disk and at a right angle to the axis of oscillation is in the plane of Fig. 3. As shown here, the left hand end of this axis is at an acute angle to the valve body 10 on the upper side and at an obtuse angle on the lower side. The other end of this axis, which is at the right hand side of Fig. 3, is at an obtuse angle on the upper side and an acute angle on the lower side. The disk, therefore, is of generally elliptical shape.

In the valve there is provided a pair of shafts 12 and 13 rotatably engaging opposite sides of the body and attached to the disk so that rotation of these shafts causes rotation of the disk. Each shaft is a relatively short stub shaft. The first stub shaft 12 is provided with an outer end portion 12a of substantially circular cross-section rotatably held in a boss 10c on the valve body 10. The portion 12a extends from the inner surface of the body 10 to a point short of the outer end of the boss 10c. This first stub shaft 12 is also provided with an inner end portion 12b of substantially circular cross-section having a diameter smaller than that of the outer end portion 12a and arranged eccentrically thereto. As shown, the inner and outer end portions 12a and 12b are arranged tangentally to each other. The inner end portion 12b engages a corresponding cavity 11a in a boss 11b in the disk 11. The second stub shaft 13 is provided with a similar outer end portion 13a and inner end portion 13b. The outer end portion 13a also rotatably engages an opening in a boss 10d. The inner end portion 13b engages a cavity in a disk boss 11c. The axes of rotation of the outer end portions 12a and 13a of the stub shafts are substantially coinciding and determine the axis of rotation of the disk 11.

The outer end of the opening in the boss 10d is preferably enlarged to provide space for a packing material 14 arranged around the outer end portion 13a of the shaft 13. This packing material is held compressed by means of a packing gland 15 contacting the packing material 14, and held in position by means of a packing nut 16 having an opening through which the shaft 13 extends and threadingly engaging the outer end of the boss 10d. The outer end of the shaft 13 is provided with a lever arm 17 rigidly attached thereto for rotating the shaft 13 and thus the disk 11 and shaft 12.

In manufacturing the valve, the peripheral surface of the disk 11 and the inner surface of the valve body 10, which is contacted by the disk, are accurately machined so that a sealing contact is obtained when the disk is in proper position and the valve closed. The shafts 12 and 13 are held rigidly attached to the disk 11 by means of tapered pins 18, 19 and 20. The pin 18 extends through the boss 11b and the inner end portion 12b. The pins 19 and 20 likewise extend through the boss 11c and the inner end portion 13b.

In assembling the valve, the disk 11 and shafts 12 and 13 are arranged in the manner described above and shown in Fig. 2. The pins 18, 19 and 20, however, are not yet placed. In order to secure the proper location of the disk 11 with respect to valve body 10, the shafts 12 and 13 are turned around the axes of rotation of the outer end portions 12a and 13a until the disk 11 is properly located. As the inner end portions 12b and 13b of the shafts are eccentric to the outer end portions 12a and 13a, this turning of the shafts shifts the location of the disk to a point where adequate contact is achieved. After this sealing contact of the disk with the body of the valve is made, the parts of the valve are held in this location and holes are drilled and reamed for the pins 18, 19 and 20. The pins are then driven in place and the smaller ends peened to fasten the pins in place. The valve is then ready for operation.

In manufacturing valves, machinery is available that permits accurate machining of the contacting surfaces. The difficulty, however, is in obtaining proper alignment of the valve disk with the valve body. With the valve constructed according to this invention, the proper alignment of the operating parts is quite simple. The only extremely accurate work, therefore, is machining the contacting surfaces of the valve body and disk.

The foregoing detailed description is given for clearness of understanding only, and no unnecessary limitations should be understood therefrom.

I claim:

1. A valve comprising: a hollow body, a pair of aligned shafts having their outer ends journalled in said body, the inner ends of said shafts being eccentrically disposed with respect to their outer journalled ends, a disk having sockets at its edge portions embracing the eccentric ends of said shafts, fastening members securing said disk to said eccentric ends of the shafts, and mechanism for oscillating said shafts and said disk.

2. The valve of claim 1 wherein, when the valve is closed, each end of the axis of said valve disk that is within the plane of the disk and at a right angle to the axis of oscillation is arranged at an acute angle to the adjacent portion of said body on one side of each end and at an obtuse angle thereto on the other side of each end.

3. The valve of claim 1 wherein said inner end of each shaft is substantially circular and has a diameter smaller than the corresponding outer end of said shaft, and the longitudinal surfaces of the inner and outer ends of each shaft are tangent to each other.

CHARLES NEIL ROSWELL.

REFERENCES CITED

The following references are of record in the file of this patent:

UNITED STATES PATENTS

| Number | Name | Date |
|---|---|---|
| 2,048,943 | Munn | July 28, 1936 |